United States Patent [19]

Roberts

[11] 4,112,123

[45] Sep. 5, 1978

[54] NUTRITIONALLY BALANCED SINGLE FOOD COMPOSITION AND METHOD OF PRODUCTION

[75] Inventor: Willard Lewis Roberts, Mequom, Wis.

[73] Assignee: Beatrice Foods Co., Chicago, Ill.

[21] Appl. No.: 707,247

[22] Filed: Jul. 21, 1976

[51] Int. Cl.$^2$ ............................................. A23C 21/00
[52] U.S. Cl. ...................................... 426/72; 426/74; 426/583; 426/801; 426/658
[58] Field of Search ............... 426/810, 656, 658, 657, 426/72, 74, 532, 579, 590, 654, 613, 556, 583; 260/112 R; 424/177, 359

[56] References Cited

U.S. PATENT DOCUMENTS

| | | | |
|---|---|---|---|
| 3,320,072 | 5/1967 | Clark et al. | 426/801 |
| 3,896,240 | 7/1975 | Gruette | 426/72 |
| 3,896,241 | 7/1975 | Malaspina | 426/590 |
| 3,922,375 | 11/1975 | Dalan | 426/590 |
| 3,935,323 | 1/1972 | Feminella et al. | 426/564 |
| 3,946,120 | 3/1976 | Vincent | 426/657 |
| 3,950,547 | 4/1976 | Lamar | 426/656 |
| 3,978,245 | 8/1976 | Deininger | 426/657 |

FOREIGN PATENT DOCUMENTS 2,135,540  2/1972  Fed. Rep. of Germany ............. 426/72

*Primary Examiner*—Hiram H. Bernstein
*Attorney, Agent, or Firm*—Murray and Whisenhunt

[57] ABSTRACT

There is provided a single nutritionally balanced food composition for oral ingestion and producing low residues and diminished stoolings for use with patients having abnormal catabolic states. The composition comprises a water soluble or suspendible, essentially undenatured protein obtained from the ultra-filtration of whey and containing beta lactoglobulin, alphalactalbumin, immunoglobulins, and serum albumin; and medium-chain triglycerides of predominately 6 to 10 carbon atoms in the fatty acid chain. The composition will also include digestable carbohydrates, e.g. dextrose, sucrose, corn syrup solids, etc., and a food grade emulsifier. The composition can provide up to three calories per cubic centimeter of solution that can be drip fed and has a low osmolarity. The composition has a Protein Efficiency Ratio (PER) which is at least 3.1 and more usually 3.2. The protein is essentially bland to the taste and the composition therefore may be flavored as desired. The composition may be provided in a dried or reconstituted form of either low viscosity for tube-feeding and sipping or high viscosities for simulated foods, e.g. custards, puddings, candies, fillings for sandwich cookies, et cetera.

25 Claims, No Drawings

NUTRITIONALLY BALANCED SINGLE FOOD COMPOSITION AND METHOD OF PRODUCTION

The present invention relates to a nutritionally balanced food composition which may be used for oral ingestion by patients having an abnormal catabolic state. More particularly, it relates to such food composition, and methods of production thereof, which are quite palatable, easy to digest, can be variously flavored, and which provide high caloric value, with complete nutritional values, but additionally with low osmolarity.

BACKGROUND OF THE INVENTION

Certain patients develop abnormal catabolic states. This arises when the body metabolizes nutrients at a greater rate than the nutrients are supplied to the body, which results in a state of destructive metabolism, also referred to as abnormal metabolism. This state can be induced by illnesses, particularly those illnesses which interfere with normal digestion. Often, this state is caused by surgery which is disruptive of normal metabolism processes. Further, the state can be induced by traumas which induce a necessity for high caloric intake. For example, a burn patient may require as many as 7,000 calories per day due to the damage to the body and the results thereof occasioned by the burn.

With patients having an abnormal catabolic state, it is a constant problem to provide the required nutrients to that patient due to the difficulties encountered as a result of a specific malady or trauma. Very often this difficulty involves the inability of the patient to masticate natural foods or to digest natural foods. Further, in some patients, the use of natural foods produces too much residue for the patient to handle, due to disruptions of the digestive track by way of disease, trauma, or surgery. In the case of burn patients, attempting to simply digest 7,000 calories of natural foods it is an extremely difficult requirement for the patient.

As a result thereof, such patients often suffer severe body weight losses during these abnormal catabolic periods, resulting in severe complications to the primary malady and often resulting in severe body damage or even in death.

To regulate the problems associated with abnormal catabolic states, the art has proposed a variety of procedures. One procedure is that of intravenous feeding, since this route does not require digestion of the nutrients and thereby avoids problems with the digestive tract. While this approach is quite successful, it does have several limitations. Thus, the total volume of liquids which can be induced into the circulatory system is limited, and if attempts are made to over load the volumetric capacity, complications of the lungs and kidneys may well result. For this reason, it is often difficult to supply the required nutrients by venous routes simply by reason of volumetric limitations of the circulatory system. Additionally, it is most dangerous to introduce fats and oils into the blood stream, and intravenous procedures have, of necessity, eliminated fats including such essential fats as linoleic acid. Also, intravenous administered sugars, e.g. dextrose, contain only about half the calories on a weight basis as common fats, and it is difficult to provide sufficiently high caloric value by sustained intravenous feeding when an abnormal catabolic state exists.

To avoid the difficulties with intravenous feeding, a variety of orally ingestible compositions has been proposed. These compositions, generally, are based on the idea of providing a correct balance of protein, or amino acids, fat, carbohydrate, vitamins, and minerals. These systems do enjoy a reasonable success, but they also impose limitations on their use. The systems prepared from some proteins are of extremely high viscosities at high protein levels and, therefore, limit the applicability to those patients who can adequately swallow high viscosity compositions. Additionally, these compositions have utilized protein, protein hydrolysates, or amino acid sources in order to avoid the problem of the digestion of natural foods. The systems prepared from protein hydrolysates or l-amino acids possess objectionable flavors that make it difficult, and in many cases impossible, for a patient to consume such products other than by tube feeding. Among the sources of nitrogen used are such sources as milk derived proteins, such as milks, casein, and the caseinates; vegetable derived proteins, such as soybean protein, protein hydrolysates, amino acid mixtures and the like. Milks as the source of protein contain high levels of lactose. Because some patients may be lactose intolerant it is desirable that foods of this type be relatively free of lactose. The proteins and protein hydrolysates used, unless supplemented with the proper essential l-amino acids, may have relatively low Protein Efficiency Ratios. In the cases of some proteins it is difficult to formulate compositions with sufficient nitrogen to provide a high calorie, nutritionally balanced composition, while at the same time avoiding the difficulties of high viscosity. The systems prepared from protein hydrolysates or 1- amino acids possess objectionable flavors. Protein hydrolysates and mixtures of l-amino acids contain the low molecular weight amino acids. These low molecular weight constituents, in combination with low molecular weight sugars and mineral compounds, used in the formulations, produce in the intestines a high concentration of low molecular weight compounds. As is known, a high concentration of such compounds induces a condition in the intestines where the osmotic pressure across the gut wall increases such that the body expels significant quantities of liquid into the intestines in an effort to wash out the high concentration of low molecular weight compounds. Thus, these compositions with high contents of low molecular weight amino acids, sugars, and salts so increases the osmotic pressure across the gut wall as to produce a condition called "dumping". The possibility of this condition is especially high with patients who require a low residue diet, because of complications in the digestive system. High osmolarity induces diarrhea in the patient as well as other related complications. The problem of high osmolarity is particularly accute in conventional compositions which rely upon protein hydrolysates and l-amino acid mixtures as the primary nitrogen source, since the amino acids in the protein hydrolysates and l-amino acid mixtures are of particularly low molecular weight and produce compositions which are particularly prone to induce "dumping".

Accordingly, it would be of distinct advantage in the art to provide compositions which avoid the problem of both intravenous feeding and feeding with conventional ingestible compositions as discussed above.

OBJECTS OF THE INVENTION

Accordingly, it is an object of the invention to provide ingestible nutritionally balanced food compositions which provide low residues and hence, diminished stooling, for use with patients having abnormal catabolic states. It is a further object of the invention to provide such compositions with high caloric content, while at the same time providing low osmolarity. It is a further object of the invention to provide such compositions with balanced amino acid source, and including fats, carbohydrates, vitamins, and minerals. It is yet a further object of the invention to provide such compositions with a protein having a high Protein Efficiency Ratio. Finally, it is an object of the invention to provide such compositions in a shelf-stable dried form, wich can be easily reconstituted to a relatively bland taste and hence, can be further formulated with flavors to provide dietary variety. Other objects will be apparent from the following disclosure and claims.

BRIEF DESCRIPTION OF THE INVENTION

The present invention is based upon the primary discovery that a particular protein presents a high nutritional profile but that profile does not include significant amounts of low molecular weight protein break down products, and thus formulations may be provided which avoid the problems of high osmolarity. Additionally, it has been discovered that the protein can be compounded with medium-chain triglycerides and carbohydrates into an emulsified product with a relatively low viscosity. This allows the composition to be used as a "tube-feeding" or drip composition, where the patient is not capable of significant mastication or has difficulty swallowing. That low viscosity also allows compounding with relatively high amounts of fats and carbohydrates to produce a composition with high caloric content.

The protein of the present invention may be described as a water soluble or suspendible, essentially undenatured protein obtained from the ultra-filtration of sweet or acid wheys and contains beta lactoglobulin, alpha lactalbumin, immunoglobulins and serum albumin.

Thus, the invention provides nutritionally balanced food composition for oral ingestion which produces low residues and diminished stooling for use with patients having abnormal catabolic states comprising from 3.5% to 27% of the above described protein, from 5% to 20% of medium-chain triglycerides of predominantly 6 to 10 carbon atoms in the fatty acid chain, from 50% to 75% carbohydrate and from 0.1% to 5% of a food grade emulsifier, all percentages being by weight on a dry basis. The resulting compositions can be used to provide solutions containing any concentration up to about three calories per cubic centimeter. Examples of useage are 0.5, 1.0, 1.5, 2.0, 2.5 and 3.0 calories per cubic centimeter. The rate of absorption and the osmolarity can be controlled by the carbohydrate used. For example low molecular weight carbohydrates, such as dextrose and sucrose, can be used when rapid absorption in the "brush border" is desired. Such solutions possess high osmolarity and should be "drip fed". High molecular weight carbohydrates, such as Low Dextrose Equivalent, high oligosaccharide content corn syrup solids can be used to produce solutions for tube or sip feeding. Such solutions possess osmolarities as low as 400 mOsm per liter of one calorie per cubic centimeter solution. Such solutions, fed at the proper rate, can be consumed without "dumping".

The Protein Efficiency Ratio of the protein is at least 3.1 and more often at least 3.2. The compositions can be compounded with the essential vitamins and minerals to supply the established Recommended Daily Allowance (RDA), or higher, based on a daily feeding of 2,000 calories.

The composition can be provided in a dried form which is easily reconstituted with water and may have such a low viscosity that drip feeding by a tube even as small as a standard size pediatric-naso-gastric tube is possible. Alternately, the dried form or reconstituted composition can be flavored to produce a sippy drink, or a more firm food such as a custard, a candy, and the like.

DETAILED DESCRIPTION OF THE INVENTION

The composition of the present invention is designed to be used as a total, nutritionally balanced single food composition, i.e. no other food for nutritional purposes is required. The total daily intake may be spread over 3, 4, 5 or 8 feedings or continuous drip, as desired, and as comfortable to the patient. The composition is based on a 2,000 calorie per day intake so that patients who do not require the higher caloric value will have a nutritionally balanced diet without undue body weight gain. However, at this level of feeding, the composition provides low residue and diminished stooling so that patients with digestive complications may easily maintain a sustaining diet with the present composition. The formulation also allows the composition to be produced in a viscosity which is sufficiently low that tube-feeding of the composition may be used. It can be drip fed at concentrations as high as 3 cal./c.c. On the other hand, if it is required to supply more than 2,000 calories per day, e.g. for burn patients, this extremely high caloric content can be achieved while yet providing a reasonably low residue. As can be appreciated, a diet consisting of 7,000 calories of natural foods of conventional compositions would produce extremely high residues and often result in complications of the digestive system.

Of critical importance to the present invention is the specific protein described above. This protein is obtained by the ultra-filtration of whey. This protein contains relatively low levels of lactose, lactic acid, and soluble salts present in whey. Other lower protein concentrate fractions derived by the ultra-filtration of whey, containing various levels of lactose, lactic acid, and soluble salts have been used as a skim milk replacer, an extender for frozen desserts, a bulking agent for dairy products, and in related applications.

The possibility of using whey protein as a substitute for natural protein has been recognized in the art. Thus, in the U.S. Pat. No. 3,935,323 to Feminella, the use of whey protein in place of egg whites in a whippable composition is acknowledged. The Feminella patent teaches heating the whey protein, in solution, to at least 90° C to produce a composition which can be whipped for up to about 8 hours after the heating.

The present protein fraction derived by ultrafiltration should be clearly distinguished from the heated protein of the Feminella patent. The present protein fraction is that which is retained by a semi-permeable membrane which allows passage of lactose, lactic acid, soluble salts, and low molecular weight compounds such as amino acids and urea. Membranes of this nature may be either synthetic polymers or cellulosic membranes. Ultra-filtration membranes are made by the following companies: Abcor, DDS (labeled Hyper-filtration membrane), Union Carbide, Romicon, Dorr-Oliver and Universal Oil Products (Fluidcides Division). All of these membranes are acceptable for producing the present protein fraction.

The present whey protein fraction is characterized in that it is essentially undenatured, or at the most not denatured to the extent that insoluble protein will settle out from the prepared solution. It is also characterized in that the dried protein can be reconstituted in water to provide an opaque liquid, which is not a normal property of denatured whey protein. The protein fraction is also water soluble (or forms a stable suspension).

The protein concentration of the solids obtained by ultra-filtration can vary from as low as 12% to as high as 95%. However, where lactose and soluble salts contents, are of no concern, the protein content is of no concern. In order to maintain a significantly low lactose content the protein content should be at least 70%, and usually at least 80% of the solids content.

Thus, for purposes of the present specification, the term "ultra-filtration whey protein" is hereby defined to mean that water soluble or suspendible, essentially undenatured protein fraction derived from cheese whey which protein fraction is, essentially, retained by an ultra-filtration membrane that permits lactose, lactic acid, and soluble salts to pass through the membrane.

It should also be clearly appreciated, however, that the present protein is specific and identifiable in terms of its composition and is not, necessarily, dependent upon a process for production thereof. Thus, the protein with the present amino acid profile may be obtained by methods other than ultra-filtration, e.g. gel filtration, and the specification and claims should be so construed.

The amount of protein used in the present composition may vary widely, but for most applications from 8% to 20% on a dry weight basis is suitable, especially between about 10% and 16% and particularly about 14%.

It is emphasized that the protein must be essentially undenatured and water soluble or suspendible, since it must be capable of being compounded or formulated into a completely stable and pourable form in order to function in the manner required. Further, it must be the protein fraction containing beta lactoglobulin, alpha lactalbumin, immunoglobulins, and serum albumin normal to whey proteins separated by ultra-filtration. The percentages of these four proteins are not critical. The usual and preferred percentages are: beta lactoglobulin 55–67% (e.g., 62%); alpha lactalbumin 13–24% (e.g., 18%); immunoglobulins 12–14% (e.g., 13%); and serium albumin 6–7% (e.g., 6.5%).

While the amino acid profile of the protein fraction may vary, Table 1 below shows a typical amino acid profile for the ultra-filtration whey protein of the present invention. That table also compares the FAO/WHO suggested amino acid pattern with the present protein as well as the amino acid profile for whole egg protein. Further, to show the difference between the present ultra-filtration whey protein and the protein normally associated with milk, i.e. casein, the amino acid profile for casein is also shown in that table. Note that the present ultra-filtration whey protein amino acid profile follows very closely that of whole egg protein, while the amino acid profile of casein is substantially different from both.

Table 2 compares the present ultra-filtration whey protein with whole egg protein, casein, and soy protein isolate in terms of the grams of protein needed to meet standard requirements, and in terms of the Protein Efficiency Ratio (PER). Note specifically that the present ultra-filtration whey protein compares very favorably with whole egg protein in each category. Since the sulfur amino acids are the limiting amino acids in whey protein the quality of the protein can be improved by the addition of methionine, e.g. to raise the methionine from 2.5 to 3.7. This produces a protein superior to egg protein (See Table 3). Since whey protein contains such high levels of the essential amino acids it is an excellent base for the preparation of foods containing amino acid patterns that benefit patients with various diseases. For example, a whey protein-essential amino acid mixture possessing FAO/WHO essential amino acid pattern can be prepared by the addition of the proper levels of each essential amino acid. Such a food would be useful for kidney disease patients who must limit their nitrogen intake. Another example would be a food for liver disease patients requiring high levels of isoleucine, leucine, and valine and low levels of phenylalanine and methionine. Still another example would be a food meeting FAO/WHO essential amino acid pattern except for a low phenylalamine content. Such a food would be of value for feeding patients with phenylketonuria. Another example would be supplementation of the whey protein with a soluble or suspendible milk co-precipitate and the desired essential amino acids to produce a lower cost high quality protein for long term feeding.

It should also be appreciated that the ultrafiltration whey protein, being derived from cheese whey, may contain small amounts of cholesterol and fat. A typical analysis of the ultra-filtration whey protein is shown in Table 4.

The medium-chain triglycerides of the present invention form an important and critical feature of the present invention. These forms of fat produce compositions of low viscosity while at the same time provide high caloric content and easily digestible compositions. MCT passes directly to the liver via the portal vien and is metabolized somewhat like carbohydrates. Long chain fatty acids pass through the digestive tract and back to the liver via the lymphatics. Suitably, the fatty acid chain of the medium-chain triglycerides will be predominantly between about 6 and 10 carbon atoms.

The proportion of medium-chain triglycerides in the composition can vary widely, but between about 5% and 20% by weight may be used. More often, however, the proportion will be about 10% and 18%, with 16% being an optimal value.

Any food grade emulsifier may be used for present emulsification purposes and, indeed, combinations of emulsifiers may be used if desired. For example, any of the long fatty acid glycerol emulsifiers may be used, which normally have a C-12 to C-20 esterified chain. Typically among these are glycerol-lacto-palmitate or the stearate, etc. Alternatively, propylene derived emulsifiers may be used, such as propylene glycol-monostearate, or the oleate, palmitate, myristate, et cetera. Likewise, the "Span" series of emulsifiers may be used. These are well-known emulsifiers and are fatty acid partial esters of sorbitol anhydrides (or sorbitan). A preferred emulsifier is the "Tween" series, which is well known to the art, and are polyoxyethylene derivatives of fatty acid partial esters of sorbitol anhydride. Typically, Tween 80 and Atmos 300 are used, for their overall combination of properties, and this is a preferred embodiment. Also, other of the well known Atmos series of mono and diglycerides may be used. Also, lecithin may be used as an emulsifier. While the amount of emulsifier will be chosen to suit the particular composition, this will generally range from about 0.1% to 5% by weight, although usually this percentage will be between about 0.5% and 3%.

The composition will also contain from 50% to 75% by weight of carbohydrates, but more often between 55% and 70%. The carbohydrates may be any of the digestable carbohydrates such as dextrose, fructose, sucrose, maltose, oligosaccharides, higher saccharides, et cetera, or mixtures thereof, depending on usage.

With compositions as described above, the caloric content of solutions can be adjusted to any desired level up to about 3 calories per cubic centimeter.

Also, with this composition the osmolarity can be varied. If desired, this value can be decreased to as low as 450 or even 400 mOsm per liter of 1 calorie per cubic centimeter of food.

Vitamins, minerals, and other trace elements can be added to the composition as desired, but for purposes of total nutritional balance, these additions should be equal to the RDA or greater based on 2,000 calories. Table 5 shows a comparison of the nutrients in a 2,000 calorie feeding of the present composition and compares those nutrients with the standard of a 2,800 calorie feeding. Additionally, the percent of the RDA provided by the present composition is shown. Of course, it is not necessary that additional vitamins and minerals be provided in the present composition, and those small amounts can be given by way of a supplemental pill or injection, if desired. Nevertheless, the preferred embodiment of the invention includes those additional vitamins and minerals. The amount of vitamins in any unit of the present composition may be chosen so that the total number of units of the composition which will be taken by a patient in a single day will supply the total desired vitamins and minerals, e.g. the RDA or higher. However, the desired daily amount may be given in one unit.

The composition is advantageously provided in a powdered form of relatively low moisture content, e.g. at least below 4% by weight and more preferably below 3% by weight. This will provide an exceptionally long shelf-stable product, e.g. at least one year shelf-stability at ambient conditions if hermetically sealed.

Conventional coloring agents, such as the USDA colors, may be used, as well as conventional preservatives, such as BHT, BHA, citric acid, et cetera.

In addition to a powdered form, emulsified liquid forms may be prepared from the same formulations used for the preparation of the dried forms. The liquid form must be pasteurized or stored under refrigerated conditions.

The dried powder may be reconstituted with any desired edible liquid which will, essentially, solvate the powder. Thus, while it is possible to reconstitute the composition with liquid such as alcohol, absent some unusual circumstances, the reconstituting liquid will be principally water. The water may contain additional ingredients, for example, alcohol, glycerol, propylene glycol, sugars, flavors and the like for the functionality imparted by those additional compositions and compounds.

The composition may also include edible acids and bases, such as acetic acid, citric acid, lactic acid, potassium hydroxide, sodium hydroxide, calcium hydroxide, ammonium hydroxide, and the like, in order to adjust the pH within the range of 3.0 to 8.0 and especially 6.5 to 7.0. Conventional buffers may also be used if desired, although the same is not necessary.

While the dried form of the invention is shelfstable, once the dried powder has been reconstituted, it must be stored under refrigeration and should be used within about 24 hours. By careful selection and processing, however, the dried composition will remain storage stable without significant degradation for one year or more. As can be appreciated, this is a very convenient form of the invention and allows hospitals and the like to conveniently store the composition and reconstitute the same as needed for preparing the foods.

In this latter regard, the dried powder is reconstituted simply by mixing with water or other liquid as described above. The ratio of water to the composition will, of course, vary with proportions of the ingredients of the composition, as discussed above, and with the desired consistency required.

Generally speaking, however, on a weight/weight basis of composition to water, the dilutions on a one liter basis will be:

| | To make 1000 ml (approx 34 oz) | |
|---|---|---|
| Calories/ml | Exact gms powd/ml water | Approx oz powd/fl oz water |
| ½ | 113.5/940 | 4/32 |
| 1 | 227 /840 | 8/28 |
| 1½ | 340 /760 | 12/26 |
| 2 | 454 /640 | 16/22 |
| 2½ | 568 /520 | 20/18 |
| 3 | 682 /400 | 24/14 |

The preferred methods for drying ingredients or compositions containing whey protein are those using relatively low temperatures in order to avoid any substantial denaturization of the protein, e.g. spray drying or freeze drying in conventional manners. However, if spray drying, the air inlet temperature should be less than 350° F (e.g. less than 300° F) and the air outlet should be less than 180° F (e.g. less than 170° F) to insure quick but cool drying of the composition.

The invention will be illustrated by the following examples, but it is to be understood that the examples illustrate only the preferred embodiment of the invention and that the invention is not restricted to that preferred embodiment but extends to the scope of the foregoing disclosure. This preferred embodiment is in connection with proportions and ingredients, the protein portion of which closely approximates the nutritional values of natural egg. As noted above, however, it is not necessary that the composition be so formulated. In the examples, all proportions are by weight, unless otherwise specifically noted.

EXAMPLE 1

The single nutritionally balanced food composition, in powder form, is prepared by blending a number of ingredients. Ingredient (A), a spray dried powder contains the whey protein, fats, emulsifiers, and antioxidants. Ingredient (B), a spray dried powder consists of encapsulated and embedded minerals. Ingredient (C) is carbohydrate. Ingredient (D) consists of encapsulated vitamins.

Preparation of Ingredient (A)

3870 lbs of U.F. whey protein concentrate prepared from acid whey containing 449 lbs. protein (561 lbs solids) is batch pasteurized 30 minutes at 150° F. or HT-ST pasteurized 16 seconds at 165° F. and promptly cooled to 80° F. The pasteurized mixture is placed in a 600 gallon processing tank and neutralized to a pH of 6.7 with 21.5% KOH solution. An oil mixture of the following ingredients is prepared:

Medium-chain triglycerides. Predominantly $C_6$ and $C_{10}$: 534.9 lbs.
Safflower Oil (high linoleic acid type): 126.4 lbs.
Atmos 300 (an emulsifier): 28.4 lbs.
Tween 80 (an emulsifier): 7.1 lbs.
Tenox 7 (an antioxidant): 0.243 lbs.

This oil mixture is placed in the neutralized protein solution and mixed thoroughly. The mixture is then homogenized at about 1500 psi and spray dried through a 72-16 spray nozzle into a conventional box spray dryer. The temperature at any point ahead of the spray nozzle should not exceed about 100° F. The spray drier inlet air temperature is 300° F. The spray drier outlet air temperature is 170° F. The moisture content of the dry powder is approximately 3% by weight.

PREPARATION OF INGREDIENT (B)

The following ingredients are mixed with water, pulverized, and spray dried in a manner similar for (A):

Mineral Compounds: 7.90 lbs.
Maltrin-10 (hydrolyzed cereal solids): 3.11 lbs.
Gelatin (250 Bloom): 0.48 lbs.
Gum Arabic: 0.48 lbs.
Water: 16.0 lbs.

PREPARATION OF FINAL FOOD POWDER

The following ingredients are compounded by thorough blending:

| | |
|---|---|
| Spray Dried Powder* (A) | 260.8 g. |
| Clin Dri 1236* | 329.9 g. |
| Sucrose* | 57.7 g. |
| Spray Dried Powder (B) | 29.5 g. |
| Vitamin Mixture | 4.9 g. |
| | 682.8 g. |

*Carbohydrate Pattern of the three ingredients. 10.1% dextrose, 8.6% maltose, 7.2% trisaccharides, 6.5% tetrasaccharides, 5.8% pentasaccharides, 4.3% hexasaccharides, 32.1% higher saccharides, 23.7% sucrose and 1.7% lactose.

The 682.8 grams is divided and packaged into six 113.5 g, (4 oz.) packets. Each packet provides 500 calories. Thus 4 daily servings of the reconstituted 4 oz. packets provides the daily requirements of protein, carbohydrates, fat, vitamins and minerals and 2000 calories.

The percent calories from the various ingredients are: protein 12.5%, carbohydrates 49.2%, and fat 38.3%. Linoleic acid contributes 5.1% of the total calories. The osmolarity of the reconstituted composition on the basis of 1 calorie per cubic centimeter is 432 mOsm per liter.

EXAMPLE 2

Composition Example 1: 100 lbs.
Florasynth #74 Strawberry Flavor: 0.6 lbs.
Hercules Light Red Shade: 0.0075 lbs.

227 g. of the above flavored and colored powder is osterized with 320 c.c. water to produce 500 c.c. of 2 cal/c.c. drink.
* high-speed, high shear mixing

EXAMPLE 3

Baked Vanilla Custard (2 cal./c.c.)

Composition Example 1: 114 g
Water: 16 oz.
Vanilla: 1 tsp.
Nutmeg: dash
Mixed and baked at 325° F until firm

EXAMPLE 4

(B) Canned Puddings

Composition Example 1: 250 g.
Strawberry Flavor-Red Color: 0.75 g.
Red Color: 0.0315 g.
Water: 220 g.

The above is osterized and 230 g. per can is placed in 211 × 300 cans and heated to 160° F. The cans are seamed and cooked in boiling water for 20 minutes.

EXAMPLE 5

Quick Puddings

Composition Example 1: 80 g.
Gelatin (250 Bloom): 1.25 g.
Water: 69 g.

The gelatin is dissolved in 130° F. water and powder is added. Mixture is osterized and cooled in refrigerator about 2 hours.

EXAMPLE 6

Candy

Composition Example 1: 331 g.
Water: 35 g.
Lemon flavor-Yellow color to taste

The mixture is rolled in Amerfond (sucrose) powder and the pieces are coated with vanilla flavor bar chocolate.

EXAMPLE 7

Sandwich Cookies

Same as for candy except use 40 g. water
The mixture is spread between cookies.

EXAMPLE 8

Curdled Dessert

Composition Example 1: 212 g.
Water: 345 g.

The mixture is brought to a simmer in a pan with stirring to produce a fine cured and cooled in a refrigerator.

TABLE I
AMINO ACID CONTENTS OF U.F. WHEY PROTEIN, WHOLE EGG PROTEIN AND CASEIN

| AMINO ACID | FAO/WHO** SUGGESTED PATTERN g. | U.F. WHEY PROTEIN g. AMINO ACIDS g./100g PROTEIN | WHOLE EGG PROTEIN g. AMINO ACIDS g./100g PROTEIN | CASEIN g. AMINO ACIDS g./100g PROTEIN |
|---|---|---|---|---|
| Isoleucine | 1.8 | 5.9 | 7.6 | 6.3 |
| Leucine | 2.5 | 13.0 | 9.7 | 9.6 |
| Lysine | 2.2 | 10.7 | 7.3 | 8.5 |
| Methionine | } 2.4 | 2.5 | 3.6 | 2.9 |
| Cystine |  | 4.2 | 2.6 | 0.35 |
| Phenylalanine | } 2.5 | 4.3 | 6.3 | 5.2 |
| Tyrosine |  | 4.1 | 4.9 | 6.5 |
| Threonine | 1.3 | 5.9 | 5.8 | 5.2 |
| Tryptophan | 0.65 | 2.5 | 1.9 | 1.8 |
| Valine | 1.8 | 6.2 | 8.6 | 7.5 |
| Histidine |  | 2.5 | 2.8 | 3.2 |
| Arginine |  | 3.4 | 7.4 | 4.3 |
| Glycine |  | 2.3 | 4.0 | 2.0 |
| Aspartic Acid |  | 12.0 | 7.4 | 7.4 |
| Glutamic Acid |  | 18.4 | 13.6 | 23.3 |
| Proline |  | 6.3 | 4.8 | 11.1 |
| Serine |  | 5.2 | 9.3 | 6.6 |
| Alanine |  | 5.6 | 7.4 | 3.3 |
|  | 15.15 | 115.0* | 115.0 | 115.05 |
| PER |  | 3.3 | 3.2 | 2.5 |

*The potential yield of amino acids from 100g. of each of the proteins is approximately 115g.
**World Health Organization Technical Report Series No. 522. Energy and Protein Requirements. Report of a Joint FAO/WHO Ad Hoc Expert Committee. - Table 17. Estimated Amino Acid Requirements of Adults. Page 55.

TABLE 2
U.F. WHEY PROTEIN, WHOLE EGG PROTEIN, AND SOY PROTEIN ISOLATE RATINGS

| PROTEIN | Grams Protein To Meet Requirements Rose's-MDR[1] | Grams Protein To Meet Requirements FAO/WHO[2] | ESSENTIAL AMINO ACIDS Per 100g. PROTEIN g. | PER |
|---|---|---|---|---|
| U.F. Whey Protein | 16.7 | 35.8 | 59.2 | 3.3 |
| Whole Egg Protein | 17.7 | 38.7 | 58.3 | 3.2 |
| Casein | 34.0 | 73.8 | 53.85 | 2.5 |
| Soy Protein Isolate | 39.5 | — | 46.7 | 1.8 |

[1] Protein required to meet Rose's Minimum Daily Requirements.
[2] Protein to match 100 g Protein with FAO/WHO Suggested Amino Acid Pattern

TABLE 5

| Nutrient | Unit | FDA RDA Per 2800 calories | Nutrients per 2000 Calories | RDA % |
|---|---|---|---|---|
| Ca | g | 1.0 | 1.5 | 150 |
| P | g | 1.0 | 1.0 | 100 |
| Na | g | * | 0.6 | * |
| K | g | * | 2.5 | * |
| Mg | mg | 400 | 400 | 100 |
| Fe | mg | 18 | 18 | 100 |
| Zn | mg | 15 | 15 | 100 |
| Cu | mg | 2 | 4 | 200 |
| Mn | mg | * | 2 | * |
| I | mcg | 150 | 150 | 100 |
| Cl | g | * | 3.55 | * |
| Vitamin A | IU | 5000 | 5000 | 100 |
| Vitamin D | IU | 400 | 400 | 100 |
| Vitamin E | IU | 30 | 40 | 133 |
| Vitamin K | mg | * | 1.0 | * |
| Vitamin C | mg | 60 | 120 | 200 |
| Thiamin | mg | 1.5 | 1.8 | 120 |
| Riboflavin | mg | 1.7 | 2.0 | 117 |
| Niacin | mg | 20 | 20 | 100 |
| d-pantothenic Acid | mg | 10 | 10 | 100 |
| Pyridoxin | mg | 2.0 | 2.0 | 100 |
| Folic Acid | mg | 0.4 | 0.4 | 100 |
| Vitamin B$_{12}$ | mcg | 6 | 6 | 100 |
| d-biotin | mg | 0.3 | 0.4 | 133 |
| Choline | mg | * | 80 | * |
| Inositol | mg | * | 16 | * |
| Linoleic Acid | g | * | 12 | * |

*No RDA established.

TABLE 4
ANALYSIS OF WHEY PROTEIN SOLIDS

| | |
|---|---|
| Protein | 80.0% |
| Fat | 4.6 |
| Lactose | 5.8 |
| Lactic Acid | 4.6 |
| Ash | 4.4 |
| Undetermined | 0.6 |
| | 100.0% |

TABLE 3
Amino Acid Content of U.F. Whey Protein (M). Whole Egg Protein. And Casein Estimated Relative Quality For Each Protein.

| Amino Acid | Fao/Who (18) Suggested Pattern & SD1 g | Fao/Who (18) Theoretical Protein Yields of Amino Acids g/100 g Protein | Fao/Who (18) Theoretical Protein Yields of Amino Acids g/28.7 g Protein | Whole Egg Protein (19-21) Yields of Amino Acids g/100 g Protein | Whole Egg Protein (19-21) Yields of Amino Acids g/38.7 g[b] Protein | U.F. Whey Protein[a] Plus Added l-Methionine Yields of Amino Acids g/100 g Protein | U.F. Whey Protein[a] Plus Added l-Methionine Yields of Amino Acids g/31.0g[b] Protein | Casein (22) Yield of Amino Acids g/100 g Protein | Casein (22) Yield of Amino Acids g/73.8g[b] Protein |
|---|---|---|---|---|---|---|---|---|---|
| Isoleucine | 1.8 | 6.3 | 1.8 | 7.6 | 2.9 | 5.8 | 1.8 | 6.3 | 4.6 |
| Leucine | 2.5 | 8.7 | 2.5 | 9.7 | 3.8 | 12.8 | 4.0 | 9.6 | 7.1 |
| Lysine | 2.2 | 7.7 | 2.2 | 7.3 | 2.8 | 10.6 | 3.3 | 8.5 | 6.3 |
| Methionine |  |  |  | 3.6 |  | 3.7 |  | 2.9 |  |
| Cystine |  |  |  | 2.6 |  | 4.1 |  | 0.35 |  |
| Meth. & Cyst. | 2.4 | 8.4 | 2.4 |  | 2.4 |  | 2.4 |  | 2.4 |
| Phenylalanine |  |  |  | 6.3 |  | 4.3 |  | 5.2 |  |
| Tyrosine |  |  |  | 4.9 |  | 4.1 |  | 6.5 |  |
| Phenyl. & Tyro. | 2.5 | 8.7 | 2.5 |  | 4.3 |  | 2.6 |  | 8.6 |
| Threonine | 1.3 | 4.5 | 1.3 | 5.8 | 2.2 | 5.8 | 1.8 | 5.2 | 3.8 |
| Tryptophan | 0.65 | 2.3 | 0.66 | 1.9 | 0.74 | 2.5 | 0.78 | 1.8 | 1.3 |
| Valine | 1.8 | 6.3 | 1.8 | 8.6 | 3.3 | 6.1 | 0.9 | 7.5 | 5.5 |

TABLE 3-continued
Amino Acid Content of U.F. Whey Protein (M). Whole Egg Protein. And Casein Estimated Relative Quality For Each Protein.

| Amino Acid | Fao/Who (18) Suggested Pattern & SD1 g | Fao/Who (18) Theoretical Protein Yields of Amino Acids g/100 g Protein | Fao/Who (18) Theoretical Protein Yields of Amino Acids g/28.7 g Protein | Whole Egg Protein (19-21) Yields of Amino Acids g/100 g Protein | Whole Egg Protein (19-21) Yields of Amino Acids g/38.7 g[b] Protein | U.F. Whey Protein[a] Plus Added l-Methionine Yields of Amino Acids g/100 g Protein | U.F. Whey Protein[a] Plus Added l-Methionine Yields of Amino Acids g/31.0g[b] Protein | Casein (22) Yield of Amino Acids g/100 g Protein | Casein (22) Yield of Amino Acids g/73.8g[b] Protein |
|---|---|---|---|---|---|---|---|---|---|
| Histidine | | ↑ | ↑ | 2.8 | 1.1 | 2.5 | 0.78 | 3.2 | 2.4 |
| Arginine | | | | 7.4 | 2.9 | 3.5 | 1.1 | 4.3 | 3.2 |
| Glycine | | ↑ | ↑ | 4.0 | 1.5 | 2.3 | 0.71 | 2.0 | 1.5 |
| Aspartic Acid | 62.1 | | 17.8 | 7.4 | 2.9 | 11.9 | 3.7 | 7.4 | 5.5 |
| Glutamic Acid | | ↓ | ↓ | 13.6 | 5.3 | 18.2 | 5.6 | 23.3 | 17.2 |
| Proline | | | | 4.8 | 1.9 | 6.2 | 1.9 | 11.1 | 8.2 |
| Serine | | | | 9.3 | 3.6 | 5.1 | 1.6 | 6.6 | 4.9 |
| Alanine | | ↓ | ↓ | 7.4 | 2.9 | 5.5 | 1.7 | 3.3 | 2.4 |
| | 115.0[c] | | 32.96 | 115.0[c] | 44.54 | 115.0[c] | 35.67 | 115.05[c] | 84.9 |

[a]1.1% of the total amino acids consists of added 1-methionine.
[b]g. Protein required to supply level of limiting essential amino acids in 28.7 g. Fao/Who theoretical protein.
[c]Analytical information calculated to a common basis for more accurate comparisons. Assumed 16g N/100 g protein in all cases. The potential yield of amino acids from 100 g protein is approximately 115 g.

What is claimed is:

1. A single food nutritionally balanced composition for oral ingestion and producing low residues and diminished stooling for use with patients having abnormal catabolis states consisting essentially of:
   (a) from 8% to 27% by weight of water soluble, undenatured ultra-filtration whey protein;
   (b) from 5% to 20% by weight of medium chain triglycerides of predominantly 6 to 10 carbon atoms in the fatty acid chain;
   (c) from 50% to 70% by weight of carbohydrates selected from the group consisting of corn syrup solids, trisaccharides, tetrasaccharides, pentasaccharides, hexasaccharides, dextrose, fructose, sucrose, maltose, oligosaccharides and higher saccharides;
   (d) from 0.1% to 5% by weight of a food grade emulsifier;
and wherein the composition provides from 1 up to about 3 calories per cubic centimeter of composition.

2. The composition of claim 1 where the Protein Efficiency Ratio of the protein is at least 3.1.

3. The composition of claim 1 where the Protein Efficiency Ratio of the protein is at least 3.2.

4. The composition of claim 1 wherein the protein is bland to the taste.

5. The composition of claim 1 wherein the amino acid profile of the protein at least equals that of eggs.

6. The composition of claim 1 where the composition contains vitamins and minerals which supply at least the established RDA when the composition is consumed in amounts to provide 2000 calories per day.

7. The composition of claim 1 which also includes at least one member selected from the group consisting of, flow control agents and flavoring agents.

8. The composition of claim 1 in a liquid form.

9. The composition of claim 8 wherein the liquid form contains water.

10. The composition of claim 1 wherein a preservative is added to the composition.

11. The composition of claim 10 wherein the preservative is citric acid.

12. The composition of claim 1 wherein the cholesterol content of the composition is less than 0.1 mg. per gram of composition.

13. The composition of claim 1 wherein the pH of the composition is between 3.0 and 8.0.

14. The composition of claim 13 wherein the pH of the composition is between 6.5 and 7.0.

15. The composition of claim 1 in flavored and colored drink form.

16. The composition of claim 1 in baked custard form.

17. The composition of claim 1 in canned pudding form.

18. The composition of claim 1 in quick pudding form.

19. The composition of claim 1 in candy form.

20. The composition of claim 1 in sandwich cookie form.

21. The composition of claim 1 in curdled dessert form.

22. The composition of claim 1 in a dried form and having a shelf life of at least one year.

23. The product of claim 1 in a frozen liquid form.

24. The composition of claim 1 in the form of a low viscosity liquid.

25. The composition of claim 1 in the form of a high viscosity liquid.

UNITED STATES PATENT AND TRADEMARK OFFICE
CERTIFICATE OF CORRECTION

PATENT NO. : 4,112,123
DATED : September 5, 1978
INVENTOR(S) : Willard Lewis Roberts It is certified that error appears in the above—identified patent and that said Letters Patent are hereby corrected as shown below:

Column 10, line 15 of Example 3, change "Water: 16 oz." to -- Water: 160 g. --

Column 10, line 67, Example 8, change "cured" to -- curd --

On the title page in connection with Item No. [75] the Inventor, change the city of the residence of the inventor from "Mequom" to -- Mequon --

Signed and Sealed this

Twentieth Day of May 1980

[SEAL]

*Attest:*

SIDNEY A. DIAMOND

*Attesting Officer*

*Commissioner of Patents and Trademarks*